US009954840B2

(12) United States Patent
Morsing et al.

(10) Patent No.: US 9,954,840 B2
(45) Date of Patent: Apr. 24, 2018

(54) GENERATING A NEGATIVE ANSWER TO A DOMAIN NAME SYSTEM QUERY THAT INDICATES RESOURCE RECORDS AS EXISTING FOR THE DOMAIN NAME REGARDLESS OF WHETHER THOSE RESOURCE RECORDS ACTUALLY EXIST FOR THE DOMAIN NAME

(71) Applicant: CLOUDFLARE, INC., San Francisco, CA (US)

(72) Inventors: Daniel Morsing, London (GB); Marek Majkowski, London (GB); Nicholas Thomas Sullivan, San Francisco, CA (US); Olafur Gudmundsson, Chevy Chase, MD (US); Filippo Valsorda, Tortona (IT)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 15/148,856

(22) Filed: May 6, 2016

(65) Prior Publication Data
US 2016/0330185 A1 Nov. 10, 2016

Related U.S. Application Data

(63) Continuation of application No. 62/159,211, filed on May 8, 2015.

(51) Int. Cl.
*H04L 29/06* (2006.01)
*H04L 29/08* (2006.01)
*H04L 29/12* (2006.01)

(52) U.S. Cl.
CPC .......... *H04L 63/08* (2013.01); *H04L 61/1511* (2013.01); *H04L 63/12* (2013.01);
(Continued)

(58) Field of Classification Search
CPC ..... H04L 63/08; H04L 61/1511; H04L 67/42; H04L 63/12; H04L 67/1036; H04L 67/10
See application file for complete search history.

(56) References Cited

U.S. PATENT DOCUMENTS 6,119,234 A * 9/2000 Aziz ....................... H04L 29/06
726/11
8,347,100 B1 * 1/2013 Thornewell ........... H04L 9/3247
713/176

(Continued)

OTHER PUBLICATIONS

RFC3845, "DNS Security (DNSSEC) NextSECure (NSEC) RData Format," Networking Working Group, Aug. 2004, pp. 1-7.*

(Continued)

*Primary Examiner* — Kari Schmidt
*Assistant Examiner* — James J Wilcox
(74) *Attorney, Agent, or Firm* — Nicholson De Vos Webster & Elliott LLP

(57) ABSTRACT

A DNS server receives, from a client device, a DNS query for a resource record type at a domain name. The DNS server determines that the resource record type does not exist at the domain name and generates an answer that indicates that the queried resource record type does not exist at the domain name and also indicates that a plurality of other resource record types exist at the domain name regardless of whether those plurality of other resource record types actually exist at the domain name. The DNS server transmits the generated answer to the client device.

15 Claims, 4 Drawing Sheets

(52) U.S. Cl.
CPC ......... *H04L 67/10* (2013.01); *H04L 67/1036* (2013.01); *H04L 67/42* (2013.01)

(56) References Cited

U.S. PATENT DOCUMENTS

| | | | | |
|---|---|---|---|---|
| 8,645,700 | B2* | 2/2014 | Smith | H04L 63/123 |
| | | | | 713/176 |
| 8,886,750 | B1* | 11/2014 | Mutz | G06F 15/16 |
| | | | | 380/277 |
| 9,106,699 | B2* | 8/2015 | Thornewell | H04L 29/12066 |
| 9,130,917 | B2* | 9/2015 | Smith | H04L 61/1511 |
| 9,338,182 | B2* | 5/2016 | Devarapalli | H04L 61/1511 |
| 9,596,266 | B1* | 3/2017 | Coleman | H04L 63/1491 |
| 9,705,682 | B2* | 7/2017 | Kaliski, Jr. | H04L 9/3247 |
| 9,705,851 | B2* | 7/2017 | Kaliski, Jr. | H04L 63/0428 |
| 2002/0124060 | A1* | 9/2002 | Jinzaki | H04L 29/12066 |
| | | | | 709/219 |
| 2004/0039798 | A1* | 2/2004 | Hotz | H04L 29/12066 |
| | | | | 709/219 |
| 2004/0044791 | A1* | 3/2004 | Pouzzner | G06F 17/22 |
| | | | | 709/245 |
| 2006/0253612 | A1* | 11/2006 | Cheshire | H04L 61/103 |
| | | | | 709/245 |
| 2006/0268802 | A1* | 11/2006 | Faccin | H04L 12/46 |
| | | | | 370/338 |
| 2007/0283028 | A1* | 12/2007 | Gilroy | H04L 29/12066 |
| | | | | 709/230 |
| 2008/0189437 | A1* | 8/2008 | Halley | H04L 12/14 |
| | | | | 709/245 |
| 2010/0005146 | A1* | 1/2010 | Drako | G06Q 10/00 |
| | | | | 709/206 |
| 2010/0106833 | A1* | 4/2010 | Banerjee | H04L 29/12066 |
| | | | | 709/226 |
| 2011/0035469 | A1* | 2/2011 | Smith | H04L 61/1511 |
| | | | | 709/220 |
| 2011/0153831 | A1* | 6/2011 | Mutnuru | H04L 29/12066 |
| | | | | 709/226 |
| 2012/0117379 | A1* | 5/2012 | Thornewell | H04L 29/12066 |
| | | | | 713/155 |
| 2012/0117621 | A1* | 5/2012 | Kondamuru | H04L 29/12066 |
| | | | | 726/3 |
| 2012/0155646 | A1* | 6/2012 | Seshadri | H04L 9/083 |
| | | | | 380/279 |
| 2012/0278626 | A1* | 11/2012 | Smith | H04L 61/1511 |
| | | | | 713/176 |
| 2012/0284505 | A1* | 11/2012 | Smith | H04L 61/1511 |
| | | | | 713/151 |
| 2012/0331524 | A1* | 12/2012 | Mower | H04L 67/025 |
| | | | | 726/3 |
| 2013/0124685 | A1* | 5/2013 | Keitel | H04L 63/0272 |
| | | | | 709/218 |
| 2013/0204978 | A1* | 8/2013 | Fleischman | H04L 61/1552 |
| | | | | 709/219 |
| 2013/0268673 | A1 | 10/2013 | Graham-Cumming | |
| 2014/0173134 | A1* | 6/2014 | Choquette | H04L 61/1511 |
| | | | | 709/245 |
| 2014/0222906 | A1* | 8/2014 | Isler | H04L 67/16 |
| | | | | 709/203 |
| 2014/0280305 | A1* | 9/2014 | James | H04L 61/1511 |
| | | | | 707/769 |
| 2014/0344925 | A1* | 11/2014 | Muthiah | H04L 61/1511 |
| | | | | 726/22 |
| 2015/0058999 | A1* | 2/2015 | McPherson | G06F 21/60 |
| | | | | 726/26 |
| 2015/0117624 | A1* | 4/2015 | Rosenshine | H04M 3/42042 |
| | | | | 379/142.04 |
| 2015/0295882 | A1* | 10/2015 | Kaliski, Jr. | H04L 61/106 |
| | | | | 709/217 |
| 2015/0312100 | A1* | 10/2015 | Chan | H04L 63/10 |
| | | | | 709/222 |
| 2015/0381558 | A1* | 12/2015 | Tuliani | H04L 63/12 |
| | | | | 713/168 |
| 2016/0197898 | A1 | 7/2016 | Hozza et al. | |
| 2016/0261750 | A1* | 9/2016 | Tubi | H04M 15/39 |
| 2016/0301656 | A1* | 10/2016 | Akcin | H04L 61/1511 |
| 2016/0308818 | A1* | 10/2016 | Torres | H04L 61/1511 |
| 2016/0330174 | A1* | 11/2016 | Sullivan | H04L 63/0281 |
| 2017/0324724 | A1* | 11/2017 | Smith | H04L 61/1511 |
| 2018/0007090 | A1* | 1/2018 | Cao | H04L 63/205 |

OTHER PUBLICATIONS

RFC7129-"Authenticated Denial of Existence in DNS," Feb. 2014, pp. 1-30.*
Bau-"A Security Evaluation of DNSSEC with NSEC 3," Mar. 2, 2010, pp. 1-18.*
Goldberg-"NSEC 5: Provably Preventing DNSSEC Zone Enumeration," Oct. 17, 2014, pp. 1-8.*
Chetioui-"Security of the DNS Protocol: Implementation & Weaknesses Analyses of DNSSEC," IJCI International Journal of Computer Science Issues, vol. 9, Issue 2, No. 3, Mar. 2012, pp. 340-345.*
R. Arends, et al., DNS Security Introduction and Requirements, Network Working Group, Request for Comments: 4033, Mar. 2005, 21 pages.
R. Arends, et al., Resource Records for the DNS Security Extensions, Network Working Group, Request for Comments: 4034, Mar. 2005, 29 pages.
R. Arends et al., Protocol Modifications for the DNS Security Extensions, Network Working Group, Request for Comments: 4035, Mar. 2005, 53 pages.
Bellis R., "DNS Proxy Implementation Guidelines," Aug. 2009, Network Working Group, Request for Comments: 5625, retrieved from the Internet, retrieved on Aug. 1, 2016.
Final Office Action from U.S. Appl. No. 15/148,867, dated Feb. 23, 2017, 15 pages.
Non-Final Office Action from U.S. Appl. No. 15/148,867 dated Aug. 11, 2016, 15 pages.
Almond C., "DNSSEC Validation and BIND9 Cache", Feb. 5, 2014, retrieved online from https://deepthought.isc.org/article/AA-00912/205/DNSSEC-validation-and-BIND9-cache.html, retrieved on Nov. 13, 2017, 3 pages.
Non-Final Office Action from U.S. Appl. No. 15/148,867, dated Nov. 22, 2017, 23 pages.

* cited by examiner

GENERATING A NEGATIVE ANSWER TO A DOMAIN NAME SYSTEM QUERY THAT INDICATES RESOURCE RECORDS AS EXISTING FOR THE DOMAIN NAME REGARDLESS OF WHETHER THOSE RESOURCE RECORDS ACTUALLY EXIST FOR THE DOMAIN NAME

CROSS-REFERENCE TO RELATED APPLICATIONS

This application claims the benefit of U.S. Provisional Application No. 62/159,211, filed May 8, 2015, which is hereby incorporated by reference.

FIELD

Embodiments of the invention relate to the field of secure network communications; and more specifically, to generating an NSEC record.

BACKGROUND

Domain Name System Security Extensions (DNSSEC) is a set of security extensions to DNS that provides a way for authenticating DNS records. DNSSEC is defined by the IETF in RFCs 4033, 4034, and 4035. Each answer from a DNS SEC protected zone is digitally signed. DNSSEC provides a way for DNS records to be trusted by whoever receives them. DNSSEC uses public key cryptography to ensure that DNS records are authentic. DNSSEC not only allows a DNS server to prove the authenticity of the records it returns, it also allows the assertion of "non-existence of records". The DNSSEC trust chain is a sequence of records that identify either a public key or a signature of a set of resource records. The root of this chain of trust is the root key which is maintained and managed by the operators of the DNS root.

Several record types are defined by DNSSEC including DNSKEY, DS, and RRSIG. The DNSKEY record type is a public key used to sign a set of resource records (RRset). The Delegation Signer (DS) record type is a delegation signer (a hash of a key). The RRSIG record type is a signature of a RRset that shares name/type/class. The DNSKEY can be classified into two roles, which can be handled by separate keys or a single key. For example, a key signing key (KSK) can be used to sign DNSKEY records. A zone signing key (ZSK) can be used to sign all other records in the domain in which it is authoritative for.

The set of all records of a given type for a domain name is called an RRset. An RRSIG (Resource Record SIGnature) is essentially a digital signature for an RRset. Each RRSIG is associated with a DNSKEY. The RRset of DNSKEYs are signed with the key signing key (KSK). All others are signed with the zone signing key (ZSK). Trust is conferred from the DNSKEY to the record though the RRSIG: if you trust a DNSKEY, then you can trust the records that are correctly signed by that key.

However, the domain's KSK is signed by itself, making it difficult to trust. The way around this is to walk the domain up to the next/parent zone. To verify that the DNSKEY for example.com is valid, you have to ask the .com authoritative server. This is where the DS record comes into play: it acts as a bridge of trust to the parent level of the DNS.

The DS record is a hash of a DNSKEY. The .com zone stores this record for each zone that has supplied DNSSEC keying information. The DS record is part of an RRset in the zone for .com and therefore has an associated RRSIG. This time, the RRset is signed by the .com ZSK. The .com DNSKEY RRset is signed by the .com KSK.

The ultimate root of trust is the KSK DNSKEY for the DNS root. This key is universally known and published. By following the chain of DNS KEY, DS and RRSIG records to the root, any record can be trusted.

These records are enough to prove the integrity of a resource record, but something more is needed in order to prove that a record does not exist. This is where two additional record types, NSEC and NSEC3, come into play.

If a DNS authoritative server knows there is no record for a specific request, it has a way to respond to such requests. When the name asked for does not exist, it returns a message that has return code (RCODE) NXDOMAIN. When the name exists, but the requested type does not, it returns a NODATA response, i.e., empty answer.

These non-existence answers are unauthenticated and could be forged by a third party just like any other DNS response. However, DNSSEC solves this problem by creating a record type that expresses what names exist, and what types reside at each name. This record is called NSEC. An NSEC can be signed by DNSSEC, and validated up to the root. Typically, NSEC is used to cover gaps between all the domains with records in the zone. In most cases, this effectively doubles the number of records in the zone, but allows an authoritative nameserver to reply with a signed response for any question.

The zone ietf.org. uses NSEC records. Asking for 'trustee.ietf.org' would give you a positive answer with an IP address and an RRSIG record. Asking for 'tustee.ietf.org' would give you a negative answer 'there are no name between trustee.ietf.org and www.ietf.org', with a corresponding RRSIG.

NSEC records require complex and unusual database access to get a list of existing types for a name, which is a source of instability. Also, NSEC makes a proxy DNS DNSSEC system unfeasible since there is no knowledge of the record types exist on the origin.

This frustrates the generation of an NSEC with incomplete knowledge of the zone. NSEC is essentially a statement that says "these types do not exist". By way of example, if the infrastructure provider does not know that a mail exchanger (MX) record exists at the Canonical Name (CNAME) target and an NSEC is sent that says "MX does not exist", then (a) a smart resolver might decide later not to make a query for MX since it knows from the NSEC that it "does not exist"; and (b) an attacker can replay that NSEC to answer a query for MX and make the client believe it does not exist when in fact it does.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for providing NextSECure (NSEC) records is described. In one embodiment, any negative answer set for a domain name is provided with a set of predefined resource records indicated as existing for the domain name, not including the record type queried, regardless of whether the resource record types actually exist for the domain name.

Figure 2:
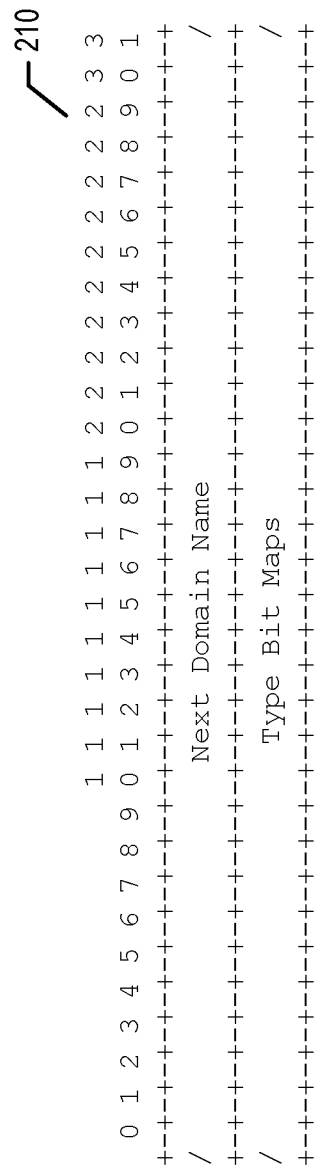
FIG. 2 illustrates an exemplary wire format of an NSEC RR as defined by RFC 4034.

FIG. 2 illustrates an exemplary wire format 210 of an NSEC resource record (RR) as defined by RFC 4034. The Next Domain Name field contains the next owner name that has authoritative data or contains a delegation point NS RRset. The value of the Next Domain Name field in the last NSEC record in the zone is the name of the zone apex (the owner name of the zone's start of authority (SOA) RR). The Type Bit Maps field was previously (prior to embodiments described herein) used to identify the RRset types that exist at the NSEC RR's owner name. As will be described later herein, in some embodiments the Type Bit Maps field is used to identify a set of RR types (in some cases all) that may or may not exist at the NSEC RR's owner name. The RR type space is split into 256 window blocks, each representing the low-order 8 bits of the 16-bit RR type space. Each block that has at least one active RR type is encoded using a single octet window number (from 0 to 255), a single octet bitmap length (from 1 to 32) indicating the number of octets used for the window blocks bitmap, and up to 32 octets (256 bits) of bitmap. Blocks are present in the NSEC RR RDATA in increasing numerical order. Each bitmap encodes the low-order 8 bits of RR types within the window block, in network bit order. The first bit is bit 0. For window block 0, bit 1 corresponds to RR type 1 (A), bit 2 corresponds to RR type 2 (NS), and so forth. For window block 1, bit 1 corresponds to RR type 257, and bit 2 to RR type 258. If a bit is set, it indicates that an RRset of that type is present for the NSEC RR's owner name. If a bit is clear, it indicates that no RRset of that type is present for the NSEC RR's owner name.

In one embodiment, for each negative answer, a defined set of record types is set as being present, regardless of whether those record types are actually present, with the exception of the record type that was queried. In one example, all of the record types, with the exception of the record type that was queried, are set as being present. To give an example, if a query for a TXT record at a domain name does not exist, the answer may indicate that the TXT record does not exist but all other types of records (or some smaller subset of records that are meaningful) exist for the domain name, regardless of whether those other types of records actually exist for the domain name. In an embodiment, this approach is not done when the answer was originally a NXDOMAIN. If a resolver follows up and queries for one of the "existing" types that does not exist, the previous false "existing" message can be negated.

Figure 1:
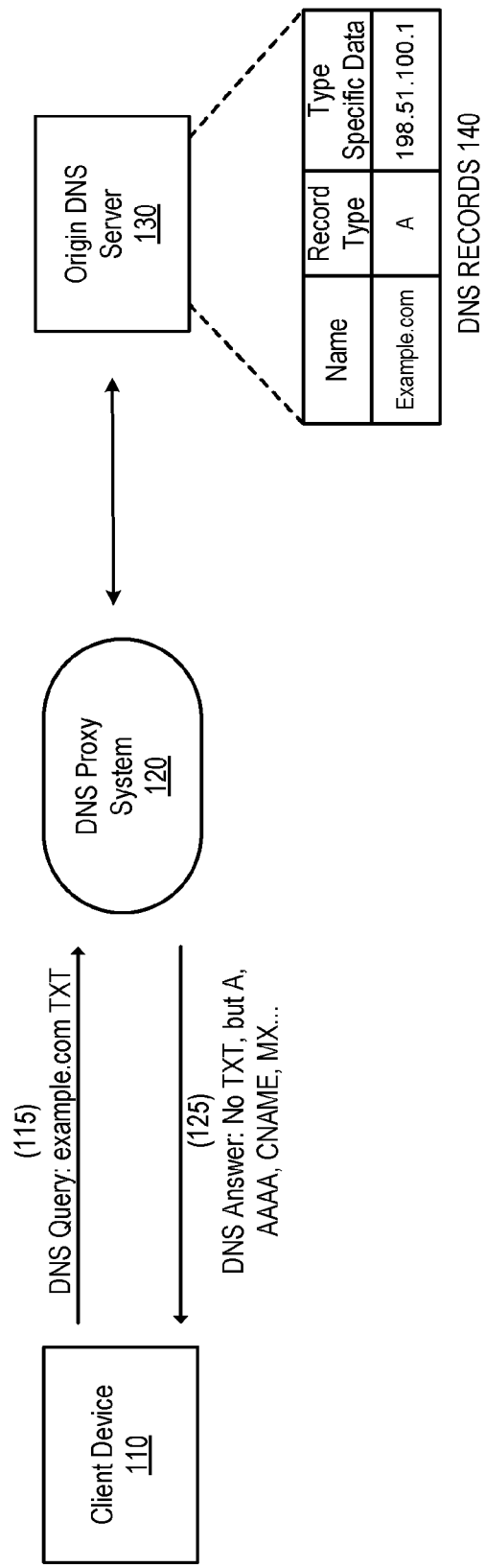
FIG. 1 illustrates an exemplary system according to some embodiments described herein.

FIG. 1 illustrates an exemplary system according to some embodiments described herein. The client device 110 is a device that queries DNS and may be a desktop computer, a laptop computer, a smartphone, or other device that makes DNS queries. The client device may include client programs that access the Internet such as a web browser or email application. For example, a user may input a domain name into the address bar of their browser (e.g., http://example.com) to access that page, which causes the browser to make a request for the IP address mapped to that domain name. It should be understood that the use of the term "client device" herein does not require that the device be an end-user client device.

The client device 110 makes DNS queries that are received by the DNS proxy system 120 on behalf of the origin DNS server 130. For example, the origin DNS server 130 may be the origin DNS server for the domain example.com. The DNS proxy system 120 may receive the DNS queries for the domain example.com as a result of the name server of the origin DNS server 130 being changed to point to a server of the DNS proxy system 120. The DNS proxy system 120 may be provided as a service and not owned and/or operated by the origin(s) provided by the origin DNS server 130. Although not illustrated in FIG. 1, the DNS proxy system 120 may cache DNS responses and, if available in cache, will return those responses to the requesters thereby saving bandwidth at the origin DNS server 130. If the DNS response is not available in cache, the DNS proxy system 120 queries the origin DNS server 130 to fetch the proper DNS response and returns the result back to the requester. This response is then cached so that it is available to be returned when the next query for the record is received.

The DNS proxy system 120 may not have a complete understanding of the zones provided by the origin DNS server 130. For instance, the DNS proxy system 120 may not, at the time of its request, know the type of records available in the DNS records 140 of the origin DNS server 130 for a particular domain name. In the example shown in FIG. 1, for the domain name example.com, there is a record type A; no other record types exist for the domain name example.com.

The client device 110 transmits a DNS query 115 for a TXT record type for the domain name example.com. This DNS query 115 is received by the DNS proxy system 120. If the DNS proxy system 120 determines that there is not a TXT record type for the domain name example.com, the DNS proxy system 120 generates an NSEC record even without a complete understanding of the zone (e.g., without a complete understanding of which record types exist for the domain example.com). For example, the DNS proxy system 120 generates an NSEC record that indicates that a TXT record does not exist for the domain example.com but all other types of records (or some smaller subset of records that are meaningful) exist for the domain name, regardless of whether those other types of records actually exist for the domain name. For instance, the DNS proxy system 120 sets the bit in the Type Bit Maps field for each RRset (or other predefined set of RRset types) with the exception of the resource record being queried (in this example the TXT record). The DNS proxy system 120 transmits the DNS answer 125 that includes the generated NSEC record to the client device 110.

Figure 3:
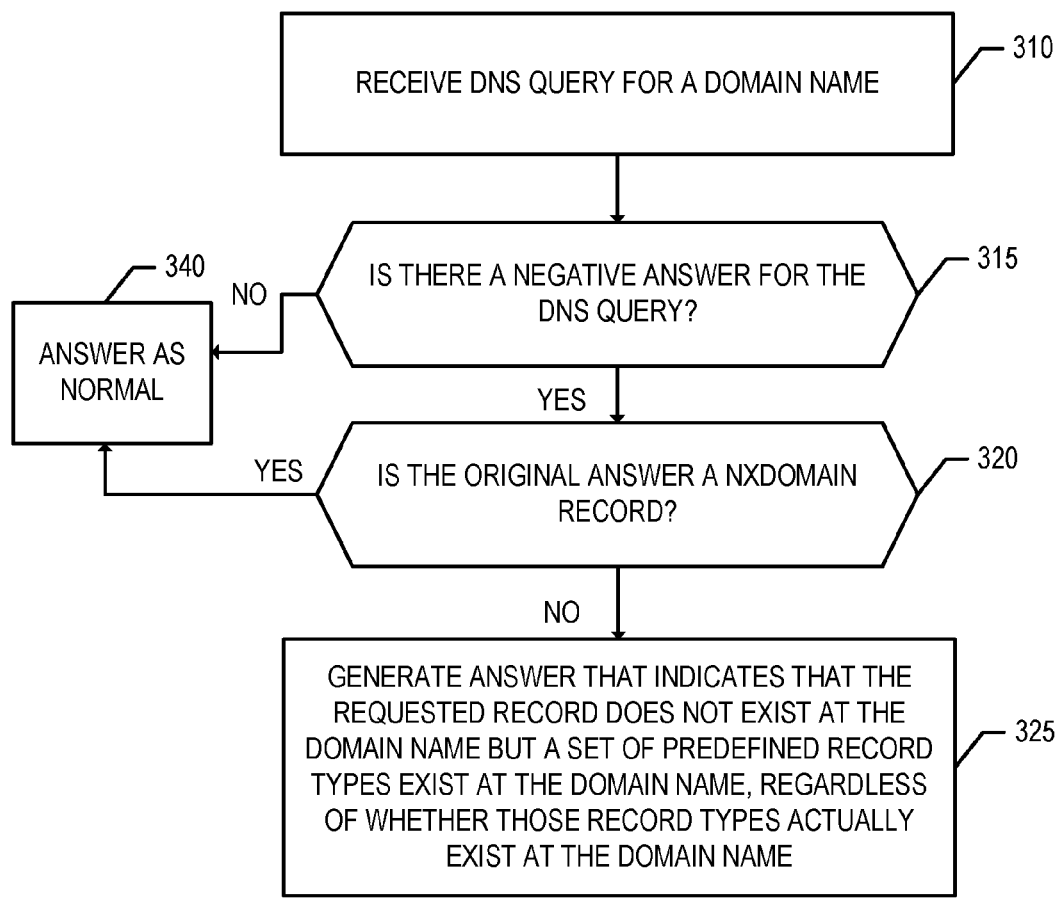
FIG. 3 is a flow diagram that illustrates exemplary operations according to some embodiments described herein.

FIG. 3 is a flow diagram that illustrates exemplary operations according to some embodiments described herein. The operations of FIG. 3 will be described with respect to the embodiment described in FIG. 1. However, it should be understood that the operations of FIG. 3 can be performed by embodiments other than those described with reference to FIG. 1, and the embodiments described with reference to FIG. 1 can perform operations other than those described with reference to FIG. 3.

At operation 310, the DNS proxy system 120 receives a DNS query for a domain name. The DNS query may specify a particular resource record type. Flow then moves to operation 315 where the DNS proxy system 120 determines whether there is a negative answer for the received DNS query. If there is not a negative answer, then flow moves to operation 340 where the DNS proxy system 120 answers in its normal fashion. If there is a negative answer, then flow moves to operation 320. At operation 320, which is optional in some embodiments, the DNS proxy system 120 determines whether the original answer would be a NXDOMAIN record, meaning that the requested domain name was not found. If the original answer would be a NXDOMAIN record, then flow moves to operation 340 and the DNS proxy system 120 answers in its normal fashion. If the original answer is not an NXDOMAIN record (e.g., the domain name exists but the requested resource record type does not), then flow moves to operation 325. At operation 325, the DNS proxy system 120 generates an answer that indicates that the requested record does not exist at the domain name but a set of predefined record types exist at the domain name, regardless of whether those record types actually exist at the domain name.

Figure 4:
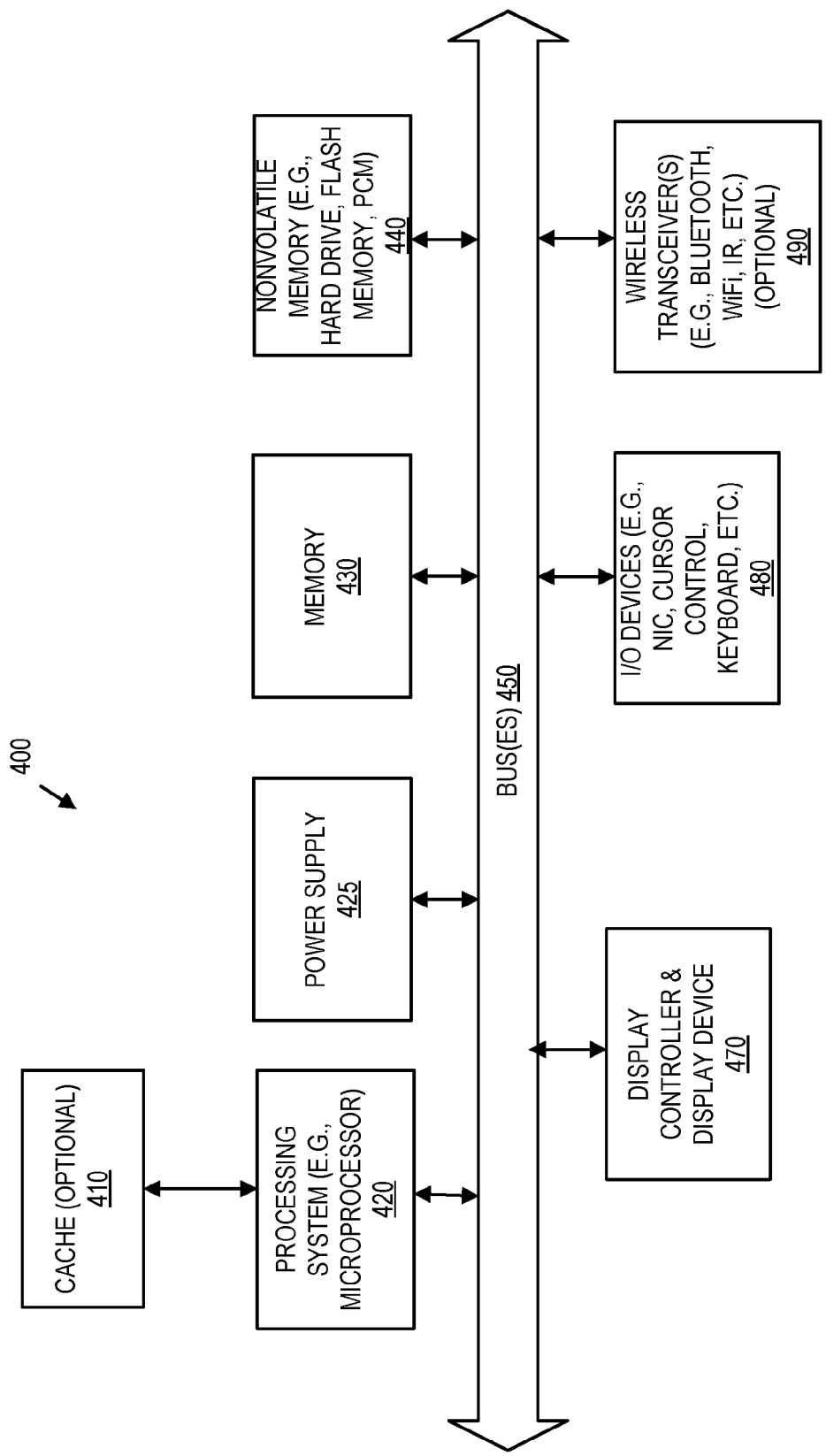
FIG. 4 illustrates an exemplary format of a computer system that may be used according to some embodiments.

As illustrated in FIG. 4, the computer system 400, which is a form of a data processing system, includes the bus(es) 450 which is coupled with the processing system 420, power supply 425, memory 430, and the nonvolatile memory 440 (e.g., a hard drive, flash memory, Phase-Change Memory (PCM), etc.). The bus(es) 450 may be connected to each other through various bridges, controllers, and/or adapters as is well known in the art. The processing system 420, which may be coupled with the optional cache 410, may retrieve instruction(s) from the memory 430 and/or the nonvolatile memory 440, and execute the instructions to perform operations described herein. The bus(es) 450 interconnect the above components together and also interconnects those components to the display controller & display device 470, Input/Output devices 480 (e.g., NIC (Network Interface Card), a cursor control (e.g., mouse, touchscreen, touchpad, etc.), a keyboard, etc.), and the optional wireless transceiver(s) 490 (e.g., Bluetooth, WiFi, Infrared, etc.). In one embodiment, the devices and/or the domain name servers of the DNS systems described herein may take the form of the computer system 400.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a Domain Name System (DNS) server, comprising:
   receiving, from a client device, a DNS query for a resource record type at a domain name;
   determining that the resource record type does not exist at the domain name;
   generating a negative answer that includes a NextSECure (NSEC) record that indicates that the queried resource record type does not exist at the domain name and also indicates that a plurality of other resource record types exist at the domain name regardless of whether those plurality of other resource record types actually exist at the domain name, wherein at least some of the plurality of other resource record types do not exist at the domain name; and
   transmitting the generated negative answer to the client device.

2. The method of claim 1, wherein the NSEC record includes a type bit maps field, and wherein generating the NSEC record includes setting a bit in the type bit maps field for each of the plurality of other resource record types and not for the queried resource record type.

3. The method of claim 1, wherein prior to generating the negative answer, determining that the domain name exists.

4. The method of claim 1, wherein the plurality of other resource record types includes each resource record type, with an exception of the queried resource record type.

5. The method of claim 1, wherein the DNS server is a proxy DNS server and receives the DNS query as a result of a name server of an origin DNS server for the domain name being changed to point to the proxy DNS server.

6. An apparatus comprising:
a Domain Name System (DNS) server including a set of one or more processors and a set of one or more non-transitory machine-readable storage mediums storing instructions, that when executed by the set of processors, cause the set of processors to perform the following operations:
receive, from a client device, a DNS query for a resource record type at a domain name;
determine that the resource record type does not exist at the domain name;
generate a negative answer that includes a NextSECure (NSEC) record that indicates that the queried resource record type does not exist at the domain name and also indicates that a plurality of other resource record types exist at the domain name regardless of whether those plurality of other resource record types actually exist at the domain name, wherein at least some of the plurality of other resource record types do not exist at the domain name; and
transmit the generated negative answer to the client device.

7. The apparatus of claim 6, wherein the NSEC record includes a type bit maps field, and wherein generation of the NSEC record includes the set of processors to set a bit in the type bit maps field for each of the plurality of other resource record types and not for the queried resource record type.

8. The apparatus of claim 6, wherein the non-transitory machine-readable storage mediums further stores instructions that when executed by the set of processors, cause the set of processors to determine that the domain name exists prior to generation of the negative answer.

9. The apparatus of claim 6, wherein the plurality of other resource record types includes each resource record type, with an exception of the queried resource record type.

10. The apparatus of claim 6, wherein the DNS server is a proxy DNS server, and wherein the DNS query is to be received as a result of a name server of an origin DNS server for the domain name being changed to point to the proxy DNS server.

11. A non-transitory machine-readable storage medium that provides instructions that, if executed by a processor of a Domain Name System (DNS) server, will cause said processor to perform operations comprising:
receiving, from a client device, a DNS query for a resource record type at a domain name;
determining that the resource record type does not exist at the domain name;
generating a negative answer that includes a NextSECure (NSEC) record that indicates that the queried resource record type does not exist at the domain name and also indicates that a plurality of other resource record types exist at the domain name regardless of whether those plurality of other resource record types actually exist at the domain name, wherein at least some of the plurality of other resource record types do not exist at the domain name; and
transmitting the generated negative answer to the client device.

12. The non-transitory machine-readable storage medium of claim 11, wherein the NSEC record includes a type bit maps field, and wherein generating the NSEC record includes setting a bit in the type bit maps field for each of the plurality of other resource record types and not for the queried resource record type.

13. The non-transitory machine-readable storage medium of claim 11, wherein the non-transitory machine-readable storage mediums further stores instructions that when executed by the processor, cause the processor to perform the following operation: prior to generating the negative answer, determining that the domain name exists.

14. The non-transitory machine-readable storage medium of claim 11, wherein the plurality of other resource record types includes each resource record type, with an exception of the queried resource record type.

15. The non-transitory machine-readable storage medium of claim 11, wherein the DNS server is a proxy DNS server and receives the DNS query as a result of a name server of an origin DNS server for the domain name being changed to point to the proxy DNS server.

* * * * *